Patented May 1, 1945

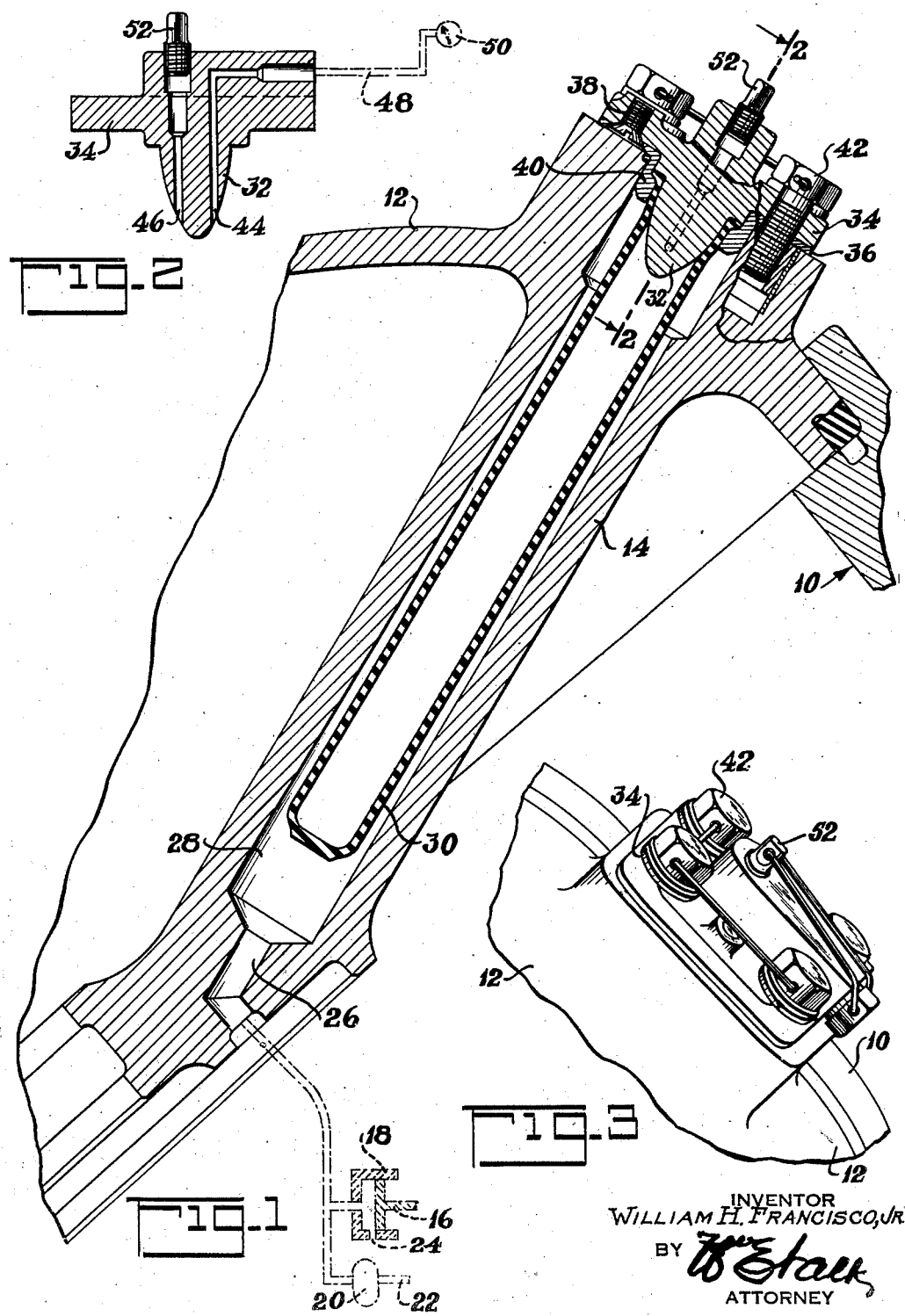

2,375,096

UNITED STATES PATENT OFFICE 2,375,096

GAUGE TO INDICATE OIL PRESSURE IN A CRANKCASE

William H. Francisco, Jr., Bloomfield, N. J., assignor to Wright Aeronautical Corporation, a corporation of New York Application July 16, 1943, Serial No. 495,014

1 Claim. (Cl. 73—395)

This invention relates to means for transmitting fluid pressure and is particularly directed to the transmission of pressure variations of a relatively viscous fluid to an indicating gauge located in a space subject to low temperatures. The invention is disclosed in connection with a torque meter for an aircraft engine but, as will become apparent, the invention is not so limited but is of general application.

It is common practice to provide modern aircraft engines with a hydraulic torque meter of the type illustrated in Patent No. 2,289,285 to Roland Chilton. As illustrated in this patent, the torque developed by the engine produces a reaction on an axially movable piston and this axial force is balanced by hydraulic oil pressure from oil supplied by the engine lubrication system. The torque meter includes a valve which automatically operates to adjust the hydraulic oil pressure to balance the existing torque reaction and the hydraulic pressure is led to a suitable gauge which may be calibrated to indicate the torque of the engine. This gauge is located on the instrument panel of the aircraft and accordingly the oil pressure line to the gauge necessarily extends outside the engine. Because of the low temperatures existing at high altitudes it has been found that the engine oil congeals in the line between the engine and the gauge, thereby rendering the gauge inoperative. It is an object of this invention to provide a separating flexible diaphragm across the oil pressure line leading to the indicator gauge whereby a lighter oil or other fluid may be placed in this line.

It is a further object of this invention to so construct and locate a separating diaphragm that the heavier engine oil is confined well within the engine casing and that only the lighter oil or other fluid is subjected to the colder external temperatures. It is a further object of this invention to provide such a separating diaphragm construction which may be readily installed within existing engines.

Other objects of this invention will become apparent upon reading the annexed detailed description in connection with the drawing in which:

Fig. 1 is an axial section through the nose portion of an aircraft engine embodying this invention, Fig. 2 is a section on line 2—2 of Fig. 1, and Fig. 3 is a plan view of the diaphragm supporting structure.

Referring to the drawing, the front section of the engine crankcase 10 is provided with a nose portion 12 having an annular flange or web 14 providing a propeller shaft bearing support. Engine torque-measuring means is schematically illustrated in dotted lines in Fig. 1 and for a more detailed description attention is directed to the aforementioned patent to R. Chilton. The torque-measuring means broadly comprises a piston element 16 slidable inside a cylinder 18 and urged to the left, as viewed in Fig. 1, by a force proportional to the torque output of the engine. A pump 20 receives engine lubricating oil through the line 22 and supplies sufficient oil pressure to the cylinder 18 to overcome the torque reaction force acting on the piston. A leak port 24 is located in the cylinder 18 so as to be controlled by the piston 16. With this construction the piston takes up a position relative to the leak port such that the fluid pressure in the cylinder just balances the force, proportional to the engine torque, acting on the piston. This fluid pressure is led through a passage 26 in the engine housing flange 14 and thence through a suitable conduit outside the engine to a pressure gauge in the aircraft. In the past the relatively heavy engine oil would congeal in this outside conduit at cold temperatures thereby rendering the gauge inoperative.

In the present construction the oil pressure from the torque-measuring means is delivered to the passage 26 and the outer portion of this passage is provided with a counterbore 28 for the reception of a long sack-like diaphragm 30 disposed across this passage. This diaphragm is adapted to be fitted over a streamlined boss 32 formed on a mounting pad 34. A gasket 36 is secured to the underside of the pad 34 by screws 38 and is provided with an annular flange portion 40 to secure the diaphragm in place about the boss 32. The pad is secured to the nose section of the engine over the oil passage 28 by bolts 42 and is provided with a pair of passages 44 and 46, best seen in Fig. 2. Both of these passages communicate with the interior of the sack-like diaphragm and a passage 44 is connected by the conduit 48 to a pressure gauge 50 for indicating the torque of the engine.

The sack-like diaphragm and conduit connection to the gauge 50 are filled with a liquid or oil of sufficiently low viscosity that this liquid does not congeal at the low temperatures encountered particularly at high altitudes. The passage 46 in the boss 32 permits filling the diaphragm and the conduit connections to the gauge 50 with the low viscosity fluid and when this portion of the system is full the passage 46 is closed by a plug 52.

The diaphragm 30, although supported from the outer periphery of the engine nose section, extends down into the engine for a substantial distance. The engine oil from the torque-measuring means is delivered through the passages 26 and 28 to the external surface of the sack-like diaphragm. The interior of the diaphragm and the connections therefrom to the indicator gauge are filled with a low viscosity fluid. With this construction the heavier engine oil whose pressure is controlled by the torque-measuring means is confined to thhe interior of the relatively warm engine by the diaphragm 30. The flexible diaphragm, by virtue of its sack-like structure extends well down into the engine so that the transmission of the torque-measuring pressure from the heavier engine oil to the lighter oil occurs at a substantial distance from the outer surface of the engine. Therefore, there is no danger of the engine oil congealing in the torque meter and preventing transmission of the torque-measuring pressure to the indicating gauge 50.

Another advantage flowing from the use of a sack-like diaphragm is that a diaphragm of this construction readily accommodates a large amount of expansion and contraction of the lighter fluid in the diaphragm and in the conduit connection to the gauge. Because of the length of the conduit 48 between the diaphragm and the gauge and because of the extreme variation in temperature encountered by aircraft such expansion and contraction of the lighter fluid may be quite large.

Although the invention has been described in connection with a torque meter for an aircraft engine the invention is not so limited. Thus, obviously, the invention may be used in conjunction with any means for indicating a condition of the engine in which the heavy engine oil is controlled to measure the condition. In fact, the invention is useful wherever the pressure of a relatively viscous fluid is to be transmitted from a relatively warm enclosure.

While I have described my invention in detail in its present preferred embodiment, it will be obvious to those skilled in the art, after understanding my invention, that various changes and modifications may be made therein without departing from the spirit or scope thereof. I aim in the appended claim to cover all such modifications and changes.

I claim as my invention:

In combination with an engine, a crankcase therefore, a supporting flange projecting inwardly from the outer wall of said crankcase and having passage means extending through said flange to the outer wall of said crankcase, a source of oil under pressure within said crankcase in communication with said passage means, said oil comprising a relatively high viscosity fluid, and means for measuring said oil pressure comprising a flexible sack-like diaphragm extending into said passage from the outer wall of said crankcase and having its open end secured adjacent to said outer wall to close the outer end of said passage, indicating means located at a point remote from said crankcase, conduit means interconnecting said indicating means with the open end of said sack-like diaphragm, and a relatively low-viscosity fluid filling said conduit means and the open side of said sack-like diaphragm whereby said oil pressure is transmitted through said diaphragm and low-viscosity fluid to said indicating means.

WILLIAM H. FRANCISCO, Jr.